US012680894B2

(12) United States Patent
Kwok et al.

(10) Patent No.: US 12,680,894 B2
(45) Date of Patent: Jul. 14, 2026

(54) OPTICAL SOFT SKIN SYSTEM FOR MULTIMODAL SENSING

(71) Applicant: THE UNIVERSITY OF HONG KONG, Hong Kong (CN)

(72) Inventors: Ka Wai Kwok, Hong Kong (CN); Kui Wang, Hong Kong (CN); Chi Hin Mak, Hong Kong (CN); Zhi Yu Liu, Hong Kong (CN); Di-Lang Ho, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 462 days.

(21) Appl. No.: 18/035,181

(22) PCT Filed: Nov. 3, 2021

(86) PCT No.: PCT/CN2021/128342
§ 371 (c)(1),
(2) Date: May 3, 2023

(87) PCT Pub. No.: WO2022/095883
PCT Pub. Date: May 12, 2022

(65) Prior Publication Data
US 2024/0011851 A1 Jan. 11, 2024

Related U.S. Application Data

(60) Provisional application No. 63/109,530, filed on Nov. 4, 2020.

(51) Int. Cl.
*G01L 1/24* (2006.01)
*G01B 11/16* (2006.01)

(52) U.S. Cl.
CPC ................ *G01L 1/24* (2013.01); *G01B 11/16* (2013.01)

(58) Field of Classification Search
CPC ........ G01L 1/24; G01B 11/16; G01D 5/35341
See application file for complete search history.

(56) References Cited

U.S. PATENT DOCUMENTS 4,653,906 A * 3/1987 Dunphy ................. G01L 1/243
250/227.16
6,563,107 B2 * 5/2003 Danisch ................ G01B 11/18
250/227.16
(Continued)

FOREIGN PATENT DOCUMENTS

WO 2013044226 A2 3/2013
WO WO-2019073424 A1 * 4/2019 ........... G01B 11/165

OTHER PUBLICATIONS

H. Wang, M. Totaro, and L. Beccai, "Toward perceptive soft robots: Progress and challenges," Advanced Science, vol. 5, No. 9, p. 1800541, 2018, 17 pages.
(Continued)

*Primary Examiner* — Freddie Kirkland, III
(74) *Attorney, Agent, or Firm* — Leason Ellis LLP

(57) ABSTRACT

An optical soft skin system for multimodal sensing comprising: a flexible waveguide substrate (10) being able to change its light wave propagation when encountering different deformation patterns; at least one light source (12) located within the waveguide substrate (10) arranged so as to transmit light into the waveguide substrate (10); at least one light receptor (14) located within the waveguide substrate (10) to receive light that has passed through the waveguide substrate (10) and to provide a dataset of the properties of the received light; and a processor (20) for decoding the dataset into at least one of strain and displacement through a computational model to determine a sensing modality of the waveguide substrate (10).

32 Claims, 4 Drawing Sheets

(56)         References Cited

U.S. PATENT DOCUMENTS

| 9,574,956 | B2 * | 2/2017 | Reck | G02B 6/10 |
| 9,625,330 | B2 | 4/2017 | Park et al. | |
| 10,527,507 | B2 | 1/2020 | Wood et al. | |
| 10,663,361 | B2 * | 5/2020 | Ciocarlie | H10F 39/18 |
| 10,976,207 | B2 * | 4/2021 | Peele | G01L 1/24 |
| 10,989,865 | B2 * | 4/2021 | Fok | G01L 1/246 |
| 2002/0088931 | A1 * | 7/2002 | Danisch | G01D 5/35383 |
| | | | | 250/227.14 |
| 2008/0205904 | A1 * | 8/2008 | Shinagawa | H04B 13/005 |
| | | | | 398/186 |
| 2012/0263410 | A1 * | 10/2012 | Feng | G02B 6/125 |
| | | | | 385/14 |
| 2015/0131100 | A1 * | 5/2015 | Reck | G01L 11/02 |
| | | | | 356/445 |
| 2018/0106692 | A1 * | 4/2018 | Ciocarlie | H10F 39/18 |
| 2019/0243062 | A1 * | 8/2019 | Fok | G01L 1/243 |
| 2019/0383678 | A1 * | 12/2019 | Peele | G01L 1/24 |
| 2019/0390985 | A1 * | 12/2019 | Kwok | G01B 11/24 |
| 2020/0057531 | A1 | 2/2020 | Yoon et al. | |
| 2020/0200972 | A1 * | 6/2020 | Steglich | G01N 21/7703 |
| 2023/0161447 | A1 | 5/2023 | Yoon et al. | |
| 2023/0375525 | A1 * | 11/2023 | Merritt | G01J 3/021 |
| 2024/0094357 | A1 * | 3/2024 | Smith | G01S 7/4876 |
| 2025/0180401 | A1 * | 6/2025 | Wu | H04B 10/502 |

OTHER PUBLICATIONS

B. Shih et al., "Electronic skins and machine learning for intelligent soft robots," Science Robotics Review, Apr. 22, 2020, 11 pages.
H. Zhao, K. O'Brien, S. Li, and R. F. Shepherd, "Optoelectronically innervated soft prosthetic hand via stretchable optical waveguides," Science robotics, vol. 1, No. 1, Dec. 6, 2016, 10 pages.
Y.-Z. Zhang et al., "MXenes stretch hydrogel sensor performance to new limits," Science advances, vol. 4, No. 6, p. eaat0098, 2018, Jun. 15, 2018, 7 pages.
G. Cheng, E. Dean-Leon, F. Bergner, J. R. G. Olvera, Q. Leboutet, and P. Mittendorfer, "A comprehensive realization of robot skin: Sensors, sensing, control, and applications," Proceedings of the IEEE, vol. 107, No. 10, 2019, pp. 2034-2051.
Z. Kappassov, D. Baimukashev, Z. Kuanyshuly, Y. Massalin, A. Urazbayev, and H. A. Varol, "Color-coded fiber-optic tactile sensor for an elastomeric robot skin," in 2019 International Conference on Robotics and Automation (ICRA), 2019: IEEE, pp. 2146-2152.
S. H. Yoon, L. Paredes, K. Huo, and K. Ramani, "MultiSoft: Soft sensor enabling real-time multimodal sensing with contact localization and deformation classification," Proceedings of the ACM on Interactive, Mobile, Wearable and Ubiquitous Technologies, vol. 2, No. 3, pp. 1-21, 2018.

A. Levi, M. Piovanelli, S. Furlan, B. Mazzolai, and L. Beccai, "Soft, transparent, electronic skin for distributed and multiple pressure sensing," Sensors, vol. 13, No. 5, 2013, pp. 6578-6604.
N. Saguin-Sprynski, L. Jouanet, B. Lacolle, and L. Biard, "Surfaces reconstruction via inertial sensors for monitoring," HAL open science, 2014, pp. 701-709.
S. Sundaram, P. Kellnhofer, Y. Li, J.-Y. Zhu, A. Torralba, and W. Matusik, "Learning the signatures of the human grasp using a scalable tactile glove," Nature, vol. 569, No. 7758, 2019, pp. 698-702.
H. Park, H. Lee, K. Park, S. Mo, and J. Kim, "Deep Neural Network Approach in Electrical Impedance Tomography-based Real-time Soft Tactile Sensor," in 2019 IEEE/RSJ International Conference on Intelligent Robots and Systems (IROS), 2019: IEEE, pp. 7447-7452.
T. L. T. Lun, K. Wang, J. D. Ho, K.-H. Lee, K. Y. Sze, and K.-W. Kwok, "Real-time surface shape sensing for soft and flexible structures using fiber Bragg gratings," IEEE Robotics and Automation Letters, vol. 4, No. 2, Oct. 10, 2019, pp. 1454-1461.
I. Van Meerbeek, C. De Sa, and R. Shepherd, "Soft optoelectronic sensory foams with proprioception," Science Robotics, vol. 3, No. 24, 2018, 7 pages.
M. Kreuzer, "Strain measurement with fiber Bragg grating sensors," HBM, Darmstadt, S2338-1.0 e, p. 12, 2006, 11 pages.
K. O. Hill and G. Meltz, "Fiber Bragg grating technology fundamentals and overview," Journal of lightwave technology, vol. 15, No. 8, , 1997 pp. 1263-1276.
R. Kashyap, Fiber Bragg gratings. Academic press, 2009, 615 pages.
M. Amanzadeh, S. M. Aminossadati, M. S. Kizil, and A. D. Rakić, "Recent developments in fibre optic shape sensing," Measurement, vol. 128, , 2018, pp. 119-137.
B. A. Childers et al., "Use of 3000 Bragg grating strain sensors distributed on four 8-m optical fibers during static load tests of a composite structure," in Smart structures and materials 2001: Industrial and commercial applications of smart structures technologies, International Society for Optics and Photonics, 2001, vol. 4332, pp. 133-142.
A. F. da Silva, A. F. Gonçalves, P. M. Mendes, and J. H. Correia, "FBG sensing glove for monitoring hand posture," IEEE Sensors Journal, vol. 11, No. 10,2011, pp. 2442-2448.
L. Xu, J. Ge, J. H. Patel, and M. P. Fok, "Dual-layer orthogonal fiber Bragg grating mesh based soft sensor for 3-dimensional shape sensing," Optics express, vol. 25, No. 20, 2017, pp. 24727-24734.
S. Rapp, L.-H. Kang, U. C. Mueller, J.-H. Han, and H. Baier, "Dynamic shape estimation by modal approach using fiber Bragg grating strain sensors," in Sensors and Smart Structures Technologies for Civil, Mechanical, and Aerospace Systems 2007, 2007, vol. 6529: International Society for Optics and Photonics, pp. 65293E-1-65293E-11.

* cited by examiner

10

12

14

14

20

Optical signal changes

Classifier

Shape reconstruction

Force sensing

Light source     RGB sensors

Sensor Prototype     Model Training     Multimodal Sensing 30     40

OPTICAL SOFT SKIN SYSTEM FOR MULTIMODAL SENSING

CROSS-REFERENCE TO RELATED PATENT APPLICATIONS

This application is a U.S. National Stage Application under 35 U.S.C. § 371 of International Patent Application No. PCT/CN2021/128342, filed Nov. 3, 2021, and claims the benefit of priority under 35 U.S.C. Section 119 (e) of U.S. Application No. 63/109,530, filed Nov. 4, 2020, all of which are incorporated by reference in their entireties. The International Application was published on May 12, 2022 as International Publication No. WO 2022/095883 A1.

TECHNICAL FIELD

The present invention relates generally to a design framework for developing an artificial flexible soft skin that enables multimodal sensing and more particularly to a soft skin sensor capable of reconstructing morphology changes, elongations and local pressure in real-time.

BACKGROUND

Skin plays an essential role in biological systems as a barrier between an organism's external environment and its internal components. The field of soft robotics studies the use of flexible and compliant materials as components for building robots, instead of traditionally rigid components, such as metals.

Providing proprioception for soft robots has been a challenging topic in recent years due to the deformable nature of soft skin. The nonlinear and complex behavior in terms of shape, position and status changes under external forces is not easy to predict, let alone to provide closed-loop control and further action planning. [1] An emerging confluence of embedded skin and machine learning is essential for autonomous and intelligent soft robots [2].

To enhance soft robot perception, a number of tactile sensors are designed to actively capture state changes of external objects [3, 4] or passively receive external forces [5-10]. The sensitivity or the resolution of a tactile sensor is often constrained by the distribution of sensing elements. Since it becomes increasingly challenging to tessellate and electrically connect a larger number of sensing elements, the sensing performance is often determined by the density of the sensor distribution. Prediction or interpolation errors for local strains at the gap between two neighboring sensing elements could be alleviated by regression methods or machine learning algorithms with a large amount of data [11-14]. In addition to sensing local strains, another type of perception involves capturing global morphology changes. The deformed shape of a flexible skin can require almost infinite degree of freedoms (DOFs) which complicates modeling and sensing schemes.

Similar to tactile sensing, recent shape sensing approaches take advantage of data-driven methods such as machine learning to encode dynamic behavior and nonlinearities captured by the sensing elements. For example, fiber optics including Fiber Bragg Gratings (FBGs) [15, 16] could map optical signals (wavelength shift, intensity) into global morphology information with the help of neural networks. For some applications or robotic systems such as MRI-guided surgery or underwater exploration, an optical-based mechanism could outperform its electrical-based counterpart. The technology features many advantages [17], including excellent electromagnetic [18] and corrosion immunity [19], and long-term stability [20]. A single fiber can carry a high density of sensing elements, which can reduce the wiring complexity [21]. However, the design of the location of the sensing elements is equivalent to a distribution of finite sensors as mentioned. As a result, the placement locations of the sensing elements still highly affect the global strains captured and will limit local strain measurements to locations proximal to each sensing element. This is illustrated in [22], where a wearable sensing glove was designed with a single FBG fiber laid across a hand in a curvilinear layout. The glove was able to monitor hand gestures and postures, however the accuracy of FBG placement and alignment with finger joints greatly affect the reconstructed hand motion. Mable et al. implemented a dual-layer FBG mesh in their 3D shape sensor. It also required precise fixture of FBG allocation, where the two fiber layers must be aligned such that each FBG is overlaid exactly on each other at 90° [23, 24]. This design depends on the precise orthogonal alignment of two fiber layers to sense and convey both convex and concave shapes. In addition to the limitations of FBG-based sensing outlined above, it is not cost-effective and is difficult to use as a stand-alone portable sensor due to the requirement for a separate and costly interrogation system connected to the optical fiber to perform sensing.

The state of the art provides insights on how to develop a robust and deployable soft skin that enables multimodal sensing. From the design perspective, the number of physical sensing elements should remain at a minimum so as not to constrain the flexibility of the sensor substrate and to minimize wiring complexity. However, the number and distribution of sensing elements should be enough to characterize its global deformation.

The cited references in this Background section, which are incorporated herein by reference in their entirety, are as follows:

[1] H. Wang, M. Totaro, and L. Beccai, "Toward perceptive soft robots: Progress and challenges," Advanced Science, vol. 5, no. 9, p. 1800541, 2018.

[2] B. Shih et al., "Electronic skins and machine learning for intelligent soft robots," 2020.

[3] H. Zhao, K. O'Brien, S. Li, and R. F. Shepherd, "Optoelectronically innervated soft prosthetic hand via stretchable optical waveguides," Science robotics, vol. 1, no. 1, 2016.

[4] Y.-Z. Zhang et al., "MXenes stretch hydrogel sensor performance to new limits," Science advances, vol. 4, no. 6, p. eaat0098, 2018.

[5] R. J. Wood et al., "Artificial skin and elastic strain sensor," ed: Google Patents, 2017.

[6] G. Cheng, E. Dean-Leon, F. Bergner, J. R. G. Olvera, Q. Leboutet, and P. Mittendorfer, "A comprehensive realization of robot skin: Sensors, sensing, control, and applications," Proceedings of the IEEE, vol. 107, no. 10, pp. 2034-2051, 2019.

[7] Z. Kappassov, D. Baimukashev, Z. Kuanyshuly, Y. Massalin, A. Urazbayev, and H. A. Varol, "Color-coded fiber-optic tactile sensor for an elastomeric robot skin," in 2019 International Conference on Robotics and Automation (ICRA), 2019: IEEE, pp. 2146-2152.

[8] S. J. Park and Z. Bao, "Methods and apparatus concerning multi-tactile sensitive (E-skin) pressure sensors," ed: Google Patents, 2017.

[9] S. H. Yoon, L. Paredes, K. Huo, and K. Ramani, "MultiSoft: Soft sensor enabling real-time multimodal sensing with contact localization and deformation classification," Proceedings of the ACM on Interactive, Mobile, Wearable and Ubiquitous Technologies, vol. 2, no. 3, pp. 1-21, 2018.

[10] A. Levi, M. Piovanelli, S. Furlan, B. Mazzolai, and L. Beccai, "Soft, transparent, electronic skin for distributed and multiple pressure sensing," Sensors, vol. 13, no. 5, pp. 6578-6604, 2013.

[11] N. Saguin-Sprynski, L. Jouanet, B. Lacolle, and L. Biard, "Surfaces reconstruction via inertial sensors for monitoring," 2014.

[12] S. Sundaram, P. Kellnhofer, Y. Li, J.-Y. Zhu, A. Torralba, and W. Matusik, "Learning the signatures of the human grasp using a scalable tactile glove," Nature, vol. 569, no. 7758, pp. 698-702, 2019.

[13] S. H. Yoon and K. Ramani, "Flexible touch sensing system and method with deformable material," ed: Google Patents, 2020.

[14] H. Park, H. Lee, K. Park, S. Mo, and J. Kim, "Deep Neural Network Approach in Electrical Impedance Tomography-based Real-time Soft Tactile Sensor," in 2019 IEEE/RSJ International Conference on Intelligent Robots and Systems (IROS), 2019: IEEE, pp. 7447-7452.

[15] T. L. T. Lun, K. Wang, J. D. Ho, K.-H. Lee, K. Y. Sze, and K.-W. Kwok, "Real-time surface shape sensing for soft and flexible structures using fiber Bragg gratings," IEEE Robotics and Automation Letters, vol. 4, no. 2, pp. 1454-1461, 2019.

[16] I. Van Meerbeek, C. De Sa, and R. Shepherd, "Soft optoelectronic sensory foams with proprioception," Science Robotics, vol. 3, no. 24, 2018.

[17] M. Kreuzer, "Strain measurement with fiber Bragg grating sensors," HBM, Darmstadt, S2338-1.0 e, p. 12, 2006.

[18] K. O. Hill and G. Meltz, "Fiber Bragg grating technology fundamentals and overview," Journal of lightwave technology, vol. 15, no. 8, pp. 1263-1276, 1997.

[19] R. Kashyap, Fiber Bragg gratings. Academic press, 2009.

[20] M. Amanzadeh, S. M. Aminossadati, M. S. Kizil, and A. D. Rakie, "Recent developments in fibre optic shape sensing," Measurement, vol. 128, pp. 119-137, 2018.

[21] B. A. Childers et al., "Use of 3000 Bragg grating strain sensors distributed on four 8-m optical fibers during static load tests of a composite structure," in Smart structures and materials 2001: Industrial and commercial applications of smart structures technologies, 2001, vol. 4332: International Society for Optics and Photonics, pp. 133-142.

[22] A. F. da Silva, A. F. Gonsalves, P. M. Mendes, and J. H. Correia, "FBG sensing glove for monitoring hand posture," IEEE Sensors Journal, vol. 11, no. 10, pp. 2442-2448, 2011.

[23] L. Xu, J. Ge, J. H. Patel, and M. P. Fok, "Dual-layer orthogonal fiber Bragg grating mesh based soft sensor for 3-dimensional shape sensing," Optics express, vol. 25, no. 20, pp. 24727-24734, 2017.

[24] S. Rapp, L.-H. Kang, U. C. Mueller, J.-H. Han, and H. Baier, "Dynamic shape estimation by modal approach using fiber Bragg grating strain sensors," in Sensors and Smart Structures Technologies for Civil, Mechanical, and Aerospace Systems 2007, 2007, vol. 6529: International Society for Optics and Photonics, p. 65293E.

Recent research in artificial skin has primarily focused on making individual sensor devices with better performance, such as sensitivity, stretchability, and reliability over many use cycles. However, a biomimetic artificial skin should contain inherently stretchable sensor arrays, be scalable to large areas with a high spatial resolution, detect changes in real-time, be useable as a standalone sensor, and have multiple sensing modalities that mimic diverse receptors of the human skin.

Generally, for artificial skins to be scaled to a larger size, the number of core sensing elements must also increase, otherwise the increase in size comes at the expense of sensing density. However, a greater number of sensing elements results in higher costs and an exponential increase in connecting and data-accessing wires. Additionally, the placement of sensing elements directly in the skin can negatively affect its mechanical properties such as flexibility and stretchability.

It is an objective of the present invention to reduce the effects of the distribution of rigid, non-stretchable components across the effective sensing surface without compromising any sensing capabilities.

These patents and literature are incorporated herein by reference in their entirety.

SUMMARY

The present invention is a design framework for developing a flexible soft skin that enables multimodal sensing, i.e. reconstructing morphology changes, elongations and local pressure in real-time. The sensor itself comprises one or more light sources and light receptors coupled at one or more ends of a flexible waveguide substrate. Development and design of the flexible soft skin is guided by finite-element analysis (FEA) and incorporates machine learning approaches to improve calibration and sensing performance.

Examples of light sources and light receptors are light emitting diodes (LED) and photodiodes (PD) respectively. By implementing an elastomeric medium with a high refractive index (e.g. Polydimethylsiloxane, PDMS) as the waveguide substrate, the emitted lights are mostly trapped within the medium due to the principle of total internal reflection (TIR). In effect, the waveguide substrate functions as an optical waveguide. The light sources project a range of light (visible or invisible) into the waveguide substrate that is subsequently detected partially or in whole by the light receptors after passing through the waveguide substrate. Deformation of the waveguide substrate will affect the light transmission between the light sources and the light receptors. Changes in light (e.g. intensity, wavelength shift, phase) caused by mechanical deformation of the waveguide substrate can be decoded into strain/displacements through analytical or machine learning approaches, hence reconstructing the corresponding deformations. Design parameters of the sensor are highly customizable for each application, including the dimensions (the sensing area), undeformed sensor shape, material of a waveguide substrate (not limited to PDMS), the optical elements (could be based on optical fibers), optical characteristics of the light sources and light receptors, or distribution/placement of the light sources and light receptors. Computational finite element (FE) analysis is introduced to validate and optimize each customized design configuration and may be used to predict the effect of sensor deformation on optical signals prior to fabrication. It further accelerates the model-based learning and reconstruction accuracy.

The present invention provides an optical soft skin system for multimodal sensing comprising:

a flexible waveguide substrate being able to change its light wave propagation when encountering different deformation patterns;

at least one light source located within the waveguide substrate arranged so as to transmit light into the waveguide substrate;

at least one light receptor located within the waveguide substrate to receive light that has passed through the waveguide substrate and to provide a dataset of the properties of the received light; and a processor for decoding the dataset into at least one of strain and displacement through a computational model to determine a sensing modality of the waveguide substrate.

In one embodiment, the waveguide substrate is made of higher refractive index material compared to that of environment in which the optical soft skin system is being used, so that light therein is trapped within the waveguide substrate according to the principle of total internal reflection.

In one embodiment, the material is Polydimethylsiloxane or hydrogel.

In one embodiment, said computational model is obtained by training a plurality of the datasets acquired under different sensing modalities.

In one embodiment, the waveguide substrate has an interwoven structure.

In one embodiment, the waveguide substrate is coated with an outer layer to reduce the influence of external light on the waveguide substrate.

In one embodiment, the processor employs a machine learning method for decoding different sensing modalities.

In one embodiment, the processor employs a finite element (FE) based data enrichment method to enlarge a dataset for model training.

In one embodiment, the waveguide substrate has a heterogeneous composition.

In one embodiment, the waveguide substrate is comprised of multiple layers of materials so as to influence wave propagation.

In one embodiment, the heterogeneous composition is periodic variations in material property to enhance sensitivity to different sensing modalities.

In one embodiment, the natural, un-deformed shape of the waveguide substrate is a flat rectangular prism.

In one embodiment, the waveguide substrate is of varying thickness.

In one embodiment, wave propagation in the waveguide substrate is affected by changes in refraction, reflection, diffraction, polarization induced by the waveguide substrate deformations.

In one embodiment, the at least one light source emits light over different spectra, including at least one of invisible light and visible light.

In one embodiment, the at least one light receptor detects light intensity, wavelength, phase, or a combination thereof.

In one embodiment, each light receptor is sensitive to the entire spectrum of light transmitted by the at least one light source.

In one embodiment, each light receptor is sensitive to a different spectrum of light transmitted by the at least one light source.

In one embodiment, the at least one light receptor is sensitive to the entire spectrum of transmitted light, or the at least one light receptor is sensitive to a specific range of the transmitted light.

In one embodiment, the at least one light source is light-emitting diode and the at least one light receptor is photodiode.

In one embodiment, there are at least three light sources which are light emitting diodes providing red, green and blue light outputs respectively.

In one embodiment, the waveguide substrate is embedded with particles that cause the transmitted light to be reflected, refracted, dispersed, absorbed or polarized when interacting with the particles.

In one embodiment, the waveguide substrate is fabricated with patterned channels or slots to enhance the effect of deformation on the transmitted light and the magnitude of association in mapping between mechanical changes and optical changes of the waveguide substrate.

In one embodiment, the detected at least one of strain and displacement induced by bending, pressing, stretching, twisting is visually reconstructed and presented in real time in three degrees of freedom.

In one embodiment, design parameters including the waveguide substrate thickness, placement and number of light sources and light receptors, type of detected and transmitted light, and waveguide substrate shape can be customized to each surface prior to fabrication through numerical analysis, namely finite-element (FE) analysis.

In one embodiment, the simulated environment improves the quantity and quality of data for model training through finite element (FE) based data enrichment.

In one embodiment, the waveguide substrate is portable and utilizes wireless communication for transmitting sensor data.

In one embodiment, the waveguide substrate is designed to be worn by a user, e.g. as a glove on their hand, as a wearable clothing device.

In one embodiment, the optical soft skin system is integrated into a robotic system for proprioception.

In one embodiment, the soft skin system further includes solid wire or liquid wire for electrical connection.

In one embodiment, the different sensing modalities includes stretching, bending, pressing and overall three dimensional surface morphology of the waveguide substrate.

BRIEF SUMMARY OF THE DRAWINGS

The foregoing and other objects and advantages of the present invention will become more apparent when considered in connection with the following detailed description and appended drawings in which like designations denote like elements in the various views, and wherein.

DETAILED DESCRIPTION

The present invention provides a flexible soft skin that enables multimodal sensing, i.e. reconstructing morphology changes (bending), elongations (stretching) and local pressure (pressing) in real-time. This soft skin utilizes optical-based sensors that are placed within the sensor substrate so as to minimize the effect on the natural bending and stretching of the skin. This soft skin also only requires limited wires for data collection. The integration of artificial intelligence (AI) and finite element analysis (FEA) makes it possible to distinguish different sensing modes, with multiple sensing functions.

Figure 1:
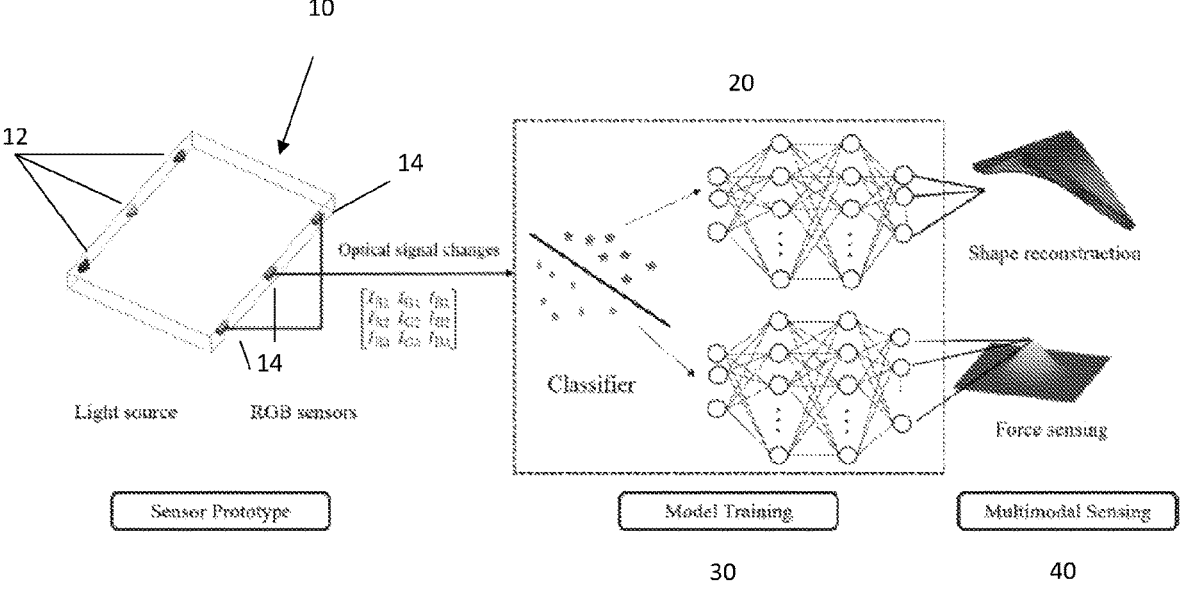
FIG. 1 is a design overview of one embodiment of the present invention.

One illustrative embodiment of the optical soft skin system as illustrated in FIG. 1 comprises:

a flexible base material/waveguide substrate 10 which changes its light wave propagation when encountering different deformation patterns (e.g. bending, stretching, pressing), and the waveguide substrate 10 is used as a waveguide;

a number of light sources 12 located within the waveguide substrate 10 arranged so as to provide light over a spectrum to the waveguide substrate 10;

a number of light receptors 14 placed near the light sources 12 within the waveguide substrate 10, which are able to detect light and its properties (e.g. intensity, wavelength) over the same spectrum as the light sources 12; the light receptor 14 is configured to receive light that has passed through the waveguide substrate 10 and to provide a dataset of the properties of the received light; the soft skin sensor/sensor consists of the waveguide substrate 10, the light sources 12 and the light receptor 14;

a processor 20 for carrying out a finite element (FE) based data enrichment method which is able to enlarge the dataset for model training;

a machine learning-based model or AI 30 carried out in processor 20 which is able to distinguish different sensing modalities in order to provide a multi-modal sensing output 40.

The waveguide substrate 10 can be made of a wide range of materials with a higher refractive index compared to that of environment in which the soft skin sensor is being used, such as ambient air, in general. The waveguide substrate 10 should be flexible and stretchable to deform when encountering internal or external forces. To provide the waveguide substrate 10 with sensing ability, the light transmittance of the material should also be high enough such that the emitted light is mostly trapped within the waveguide substrate 10 according to the principle of TIR. The waveguide substrate 10 may be uniform in structure, such as a homogeneous composition with constant density and cross-section along its length (e.g. a slab of PDMS in the shape of a rectangular prism), or may have a non-uniform structure with varying or repeating patterns (e.g. an interwoven structure). Such non-uniform structure may be constructed such that the sensor's sensitivity to particular deformation is increased. For example, a waveguide substrate 10 with a serpentine/zig-zag layout wherein light propagation is limited when not under deformation, but when the sensor undergoes elongating deformation, the serpentine/zig-zag structure is straightened to allow improved light propagation through the waveguide substrate, thus improving the sensor's sensitivity to elongation. Alternatives other than PDMS, including hydrogels, can be used to form the waveguide substrate 10.

Further, the waveguide substrate 10 may have a heterogeneous composition to influence wave propagation through the sensor and alter the sensing characteristics of the sensor such as sensitivity to different deformations. Examples include a waveguide substrate comprising multiple material layers that improve light propagation within the substrate, i.e. to maintain TIR. Another example is a waveguide substrate that contains periodic variations in some waveguide characteristics e.g. variations caused by multiple layers of alternating materials with different optical properties (e.g. refractive index), or by varying structural characteristics such as material height. The result would enhance the sensor sensitivity to particular types of deformations (e.g. bending, stretching, local pressure).

As an example, the soft skin sensor may comprise 5 layers of PDMS in different thicknesses and light transmittance. A transparent PDMS layer is first sandwiched by two white-dyed PDMS layers, followed by a black-dyed PDMS encasement. The black layers aim to fully eliminate external light influences while the white layers enhance internal light transmission. All light sources and light receptors (e.g. RGB LED and PD) are embedded at the core transparent layer where total internal reflection occurs as suggested in earlier disclosure forms.

The soft skin system comprises multiple light sources 12 and light receptors 14 coupled at two or more ends of the waveguide substrate 10. The multiple light sources 12 and light receptors 14 may be embedded in the waveguide substrate. In an example, the light source is LED and the light receptor is photodiodes (PD). However, the light source 12 and light receptor 14 are not limited to the visible light spectrum and the use of LED-PD pairs, for example, could be replaced with fiber optics.

To ensure stable mapping between mechanical changes and optical changes of the sensor, additional fabrication steps are included to: i) reduce external optical influences, for example, by coating a reflective layer on the wave guide material and ii) enlarge or change internal optical losses, for example, by integrating photoreactive particles into the waveguide substrate. In particular, the particles can cause the transmitted light to be reflected, refracted, dispersed, absorbed or polarized when interacting with the particles. In addition, the waveguide substrate may be fabricated with one or more patterned channels or slots across material layers. For example, the cavities may be comprised of a serpentine hollow channel in the first layer, parallel and square wave channels in the second and third layer respectively. These all help in enhancing the effect of deformation on the transmitted light and increase signal uniqueness detected by the photo receptors.

Prior to fabrication, a pre-FEA is used to optimize the overall design parameters according to application-based design. It includes the number and the distribution of light sources and light receptors, dimensions of waveguide substrate, as well as material properties such as stiffness and light transmittance. Deformations and strains for all possible modalities are simulated in COMSOL Multiphysics, in which the geometrical shape is firstly determined. The waveguide substrate is modeled as hyperelastic material and meshed in C3D8RH linear brick elements. With appropriate mechanical equations and material properties, including elastic modulus, Poisson's ratio and parameters of Mooney-Rivlin hyperelastic model, a virtual environment is set up. It enables cost-effective design modification as well as scientifically justified performance enhancement. For example, LED-PD pairs will be optimally placed at areas without high strains but with a relatively larger displacement. In an embodiment, the effective distance for each pair of LED-PD is also tested to cover an area of local deformation (diameter≈5 cm). With reference to effective distance and area of sensing, the number of LED-PD pairs are determined based on total area.

In the model training phase 30, any technology that can obtain information on the 3D surface shape of the sensor is suitable for obtaining the ground truth. Examples include motion tracking systems, electromagnetic-based tracking systems, mono/stereo camera systems and laser-scanning systems. These technologies provide a number of nodes with 3D spatial coordinates, however, may not be sufficient for model training phase 30. To enrich the number of ground truth, waveguide substrate can be placed on 3D-printed fixtures with known dimensions. Alternatively, dynamic motion of nodal displacements can be obtained by FE analysis, where iterative computation is capable to generate large amount of noise-free, spatially continuous training inputs. It leverages limited ground truths to dense unlimited information, such that a spatially continuous waveguide substrate is simulated in response to light intensity change. Summing up, both skin design optimization and data enrichment for model training are performed respectively using a well-established virtual environment.

Multi-task learning (MTL) is an example of a machine learning algorithm used in model training phase 30. MTL relies on a data-driven classifier and regressor networks to distinguish task-specific models. It decodes the relationship between the input sensing data and predicted deformation patterns of different modalities. Features of each modality will be leveraged by task-specific layers and used for classification. For example, pressure gradient exerted by pressing and bending is inherently different, in terms of both strains and optical signals. The difference is learnt in MTL and modalities can then be differentiated. Irrelevance feature that acts as noise to another task is also removed for more accurate classification.

In case of shape sensing, dataset of optical signals and morphological changes are captured synchronously in a finite time interval. Followed by FE-based data enrichment, dataset is normalized and separated into a training set and test set in the proportion of 7:3. Three kinds of DNN model perform well on the data. The first attempt was multi-layer perceptron (MLP), which was composed of 4 hidden layers with 256/512/512/512 neurons. The second was TimeLeNet (see Le Guennec, Arthur, Simon Malinowski, and Romain Tavenard. "Data augmentation for time series classification using convolutional neural networks." *ECML/PKDD workshop on advanced analytics and learning on temporal data*. 2016), consisting of 2 convolutional layers and 2 fully-connected layers. Recurrent neural network (RNN) with 2 Long short-term memory (LSTM) layers and 4 fully-connected layers was also employed. The performance of models, including test mean square error (MSE) and test time (the time cost for one batch data), are listed in Table 1. The preliminary results displayed that optical signal was in a unique end-to-end mapping with the morphological changes, such that it can be well estimated by DNN.

TABLE 1

The performance of (deep) neural network models

| Model | MSE/mm | Test time/s |
|---|---|---|
| MLP | ~4.5 | 0.012 |
| Time LeNet | ~4 | 0.0156 |
| RNN | ~6 | 2 |

In addition, the primitive architecture shows that temporal relation between optical signals and displacement can be learnt through manipulating the number of neurons, network layers and time window size; while the spatial nodes relation can be learnt through the use of convolution neural network. It highly facilitates the upfront system design based on its application.

Real-time reconstruction and characterization is achieved with the present invention. The sensing performance is validated through different deformation patterns such as large bending, elongation and local pressure due to fingers. The responses are tested with stability, repeatability and hysteresis.

As indicated above, the light-emitting diode (LED) and photodiode (PD) are selected as the exemplary embedded sensing elements, due to the ease of fabrication and market availability. The existing technology of these fundamental optical components is mature enough to provide robust, repeatable feedback. As shown in FIG. 1, LEDs of three different wavelengths (color of visible lights—red, green and blue) are selected and embedded at the end of the waveguide substrate 10, which is made of silicone elastomer PDMS with a refractive index 1.4. Emitted light rays are mostly trapped within the PDMS waveguide due to TIR. The remaining transmitted light is captured by three photodiode arrays 14 which can detect the red, green, and blue (RGB) light. In other words, the raw sensor data obtained from the artificial skin is a 3×3 intensity matrix at every iteration and is fed-forward as training input data.

The intensity changes under external mechanical stimuli are mapped to strains and displacements using the neural network 20 and the machine learning-based model 30. The output data is then visually reconstructed and presented in real time as shape reconstruction and force sensing. The detected strain/displacement induced by bending, pressing, stretching, twisting is reconstructed in three degrees of freedom.

Figure 2A:
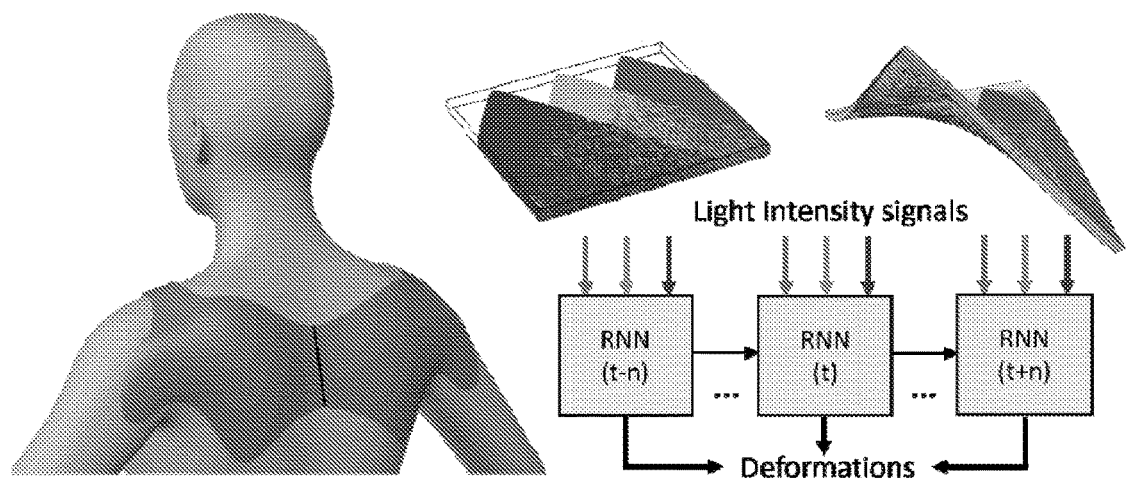
FIG. 2A depicts how simulated light signals vary when the sensor is attached to human body.
Figure 2B:
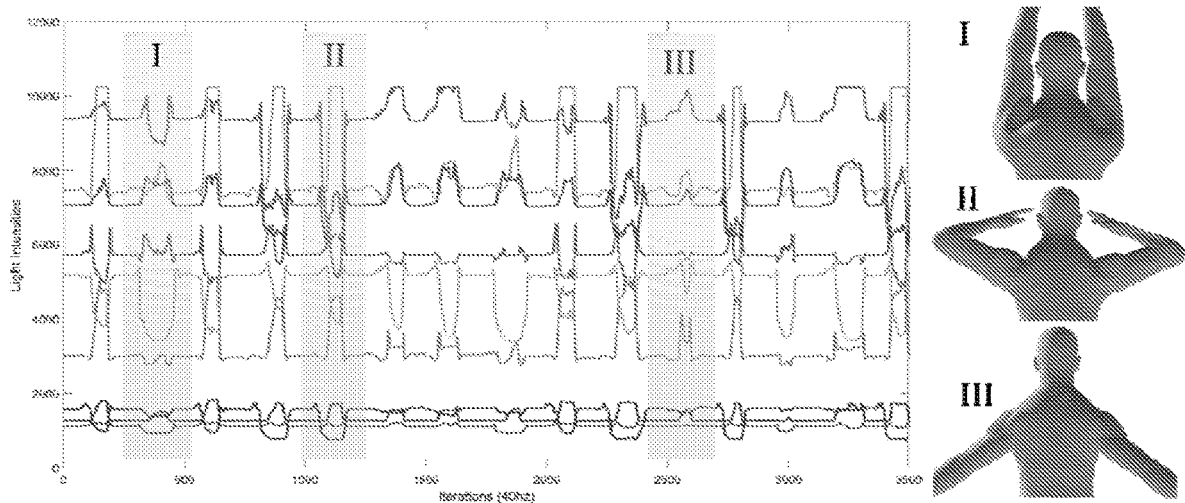
FIG. 2B depicts how simulated light signals vary in time domain according to continuous human motions when the sensor is attached to human body.

By placing monochromatic LEDs at different positions, light rays with different wavelengths mix together, resulting in an analytical distribution of RGB intensities due to TIR between ambient air and PDMS. See FIG. 2A. The actual intensities are captured by an array of photodiodes (or a CMOS camera). The photodiodes only capture a small area of the emitted light; however, it is sufficient for a training model. Under mechanical deformation, some emitted light rays are no longer internally reflected upon boundaries and may vary in their trajectory. In other words, deformations induce the changes of light trajectories and refraction loss, resulting in the changes of intensities captured by the embedded photodiodes as shown in FIG. 2A, which can then be analyzed and processed for multimodal sensing. When attached to a human body as depicted in FIG. 2A, various arm gestures in FIG. 2B can be decoded with time-varying light signals through the use of RNN. Despite optical intensity variation, the wavelength of the light remains unchanged.

Figure 3A:
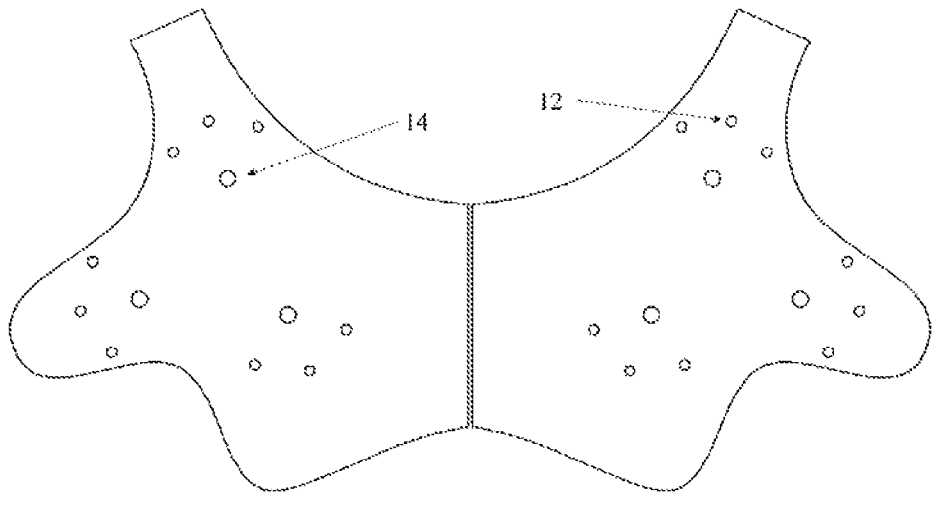
FIG. 3A shows the distribution of the light sources and light receptors over an upper-back wearable prototype.
Figure 3B:
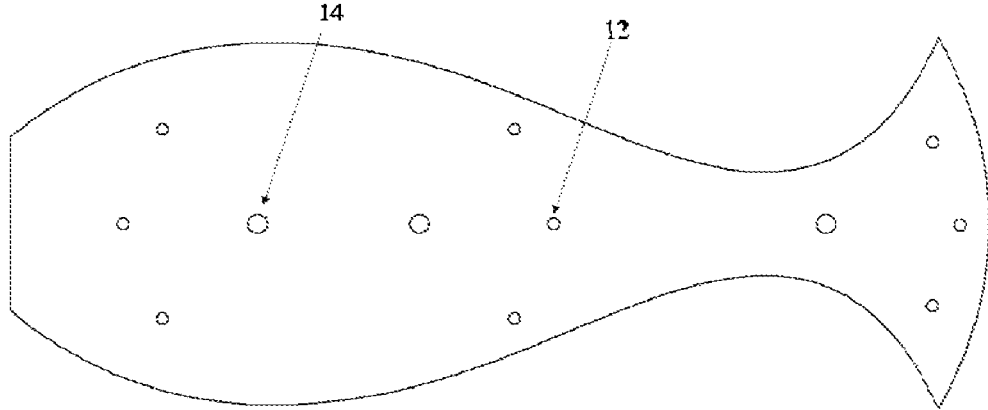
FIG. 3B shows the distribution of the light sources and light receptors over a fish-shaped prototype.

Two geometrically different prototypes are tested to validate the proposed soft skin system (see FIGS. 3A and 3B). FIG. 3A shows the distribution of the light sources and light receptors over an upper-back wearable prototype, and FIG. 3B shows the distribution of the light sources and light receptors over a fish-shaped prototype. As shown in FIGS. 3A and 3B, the smaller circle represents the light source 12 such as LED, and the larger circle represents the light receptor 14 such as photodiode. Previous accurate offline reconstructions have shown that when design parameters vary (e.g. number of LED-photodiode pairs and its distribution), morphological changes can still be predicted based on its unique mapping with light signals.

Figure 4:
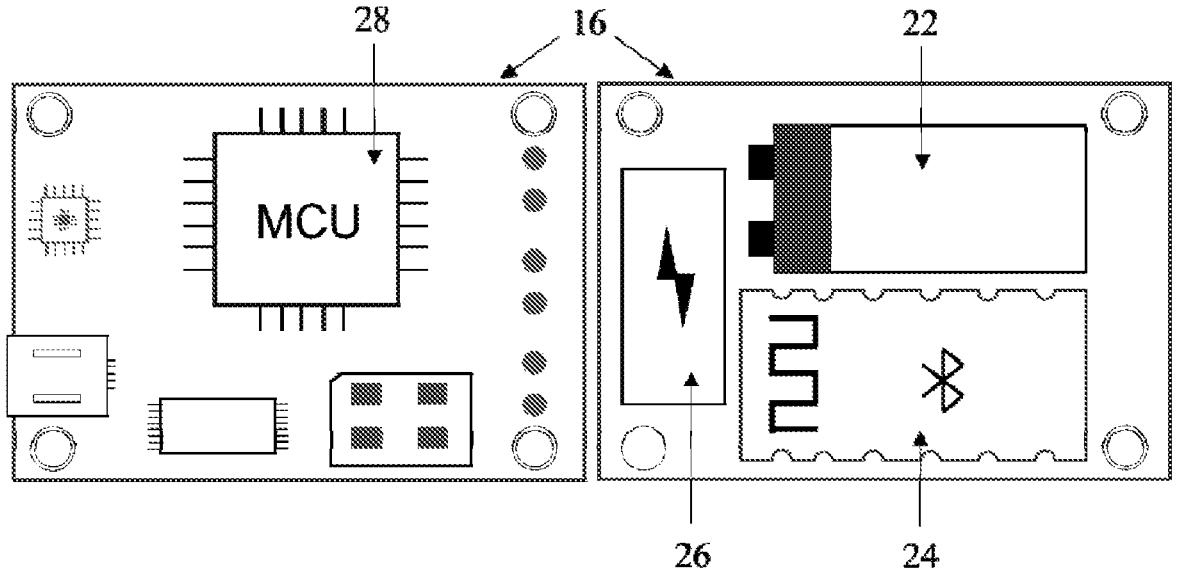
FIG. 4 shows the top and bottom view of a customized PCB wirelessly transmitting light signals.

As an example, three monochromatic 0805 LED (red, green, blue) and nine 3×4 photodiode arrays (TCS34725FN) may be embedded within PDMS (Sylgard 184) substrate (see FIGS. 3A and 3B). The silicone elastomer is molded under 45° C. for 6 hours with a mixing ratio of 10:1 to enhance flexibility. It could be made stiffer with a larger mixing ratio and higher curing temperature. Each photodiode array can be connected to an off-the-shelf dedicated breakout board to convert amplified photodiode currents to a 16-bit digital value. These signals can also be transmitted via wireless communication with a customized printed circuit board (PCB) board 16 in FIG. 4, which may comprise rechargeable battery 22, Bluetooth module 24, charging adaptor 26, and microcontroller unit 28 for the entire embedded circuit.

In an example, a Field Programmable Gate Arrays (FPGA)-based printed circuit board (PCB) is designed. Light signals are transmitted and multiplexed at 30 Hz via Bluetooth, which we believe that it provides a solid basis for future commercialized sensing system.

In an embodiment, all optomechanical components in the waveguide substrate are connected by rigid copper wires, and the route wires are intentionally designed into a wavy shape to increase the overall mechanical conformability. In another embodiment, all route wires in the soft skin system could be replaced by liquid conductive inks (e.g. eutectic Gallium-Indium) commonly used in the discipline of microfluidics and biochemical devices. The liquid wire has the advantage of helping to realize a flexible structure.

The soft skin of the present invention can be used for mobile robots. In such a case, when the sensor is portable, its signals can be transmitted to a remote control unit by wireless communications, e.g., Wi-Fi or Bluetooth. As for existing advanced robotic systems that require intelligent sensing feedback, the present invention can also be installed externally. For example, industrial-grade collaborative robots demanding robust yet high sensing accuracy up to sub-millimetre-scale. Additionally, the soft skin substrate can be attached as a wearable sensor which could be used as a controller/motion input for virtual reality games (e.g. a glove-like controller), for detecting or monitoring patient behaviour and posture in rehabilitation/physiotherapy, as depicted in FIG. 2A and FIG. 3A.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of example and not by way of limitation. The description enables one skilled in the art to make and use the present invention, and describes several embodiments, adaptations, variations, and method of uses of the present invention.

The invention claimed is:

1. An optical soft skin system for multimodal sensing comprising:
   a flexible waveguide substrate being able to change its light wave propagation when encountering different deformation patterns;
   at least one light source located within the waveguide substrate arranged so as to transmit light into the waveguide substrate;
   at least one light receptor located within the waveguide substrate to receive light that has passed through the waveguide substrate and to provide a dataset of the properties of the received light, each light receptor being sensitive to a different spectrum of light transmitted by each at least one light source; and a processor configured to decode the dataset into at least one of strain and displacement through a computational model to determine a sensing modality of the waveguide substrate to modes of bending, pressing, stretching and twisting.

2. The optical soft skin system for multimodal sensing of claim 1, wherein the waveguide substrate is made of higher refractive index material compared to that of an environment in which the optical soft skin system is being used, so that light therein is trapped within the waveguide substrate according to the principle of total internal reflection.

3. The optical soft skin system for multimodal sensing of claim 2, wherein the material is Polydimethylsiloxane or hydrogel.

4. The optical soft skin system for multimodal sensing of claim 2, wherein the waveguide substrate has an interwoven structure.

5. The optical soft skin system for multimodal sensing of claim 2, wherein the waveguide substrate is coated with an outer layer to reduce the influence of external light on the waveguide substrate.

6. The optical soft skin system for multimodal sensing of claim 1, wherein said computational model used by said processor is a machine learning model that has been trained a on a plurality of the datasets acquired under different sensing modalities.

7. The optical soft skin system for multimodal sensing of claim 6, wherein the plurality of the datasets has been enlarged by employing a finite element (FE) based data enrichment method to enlarge the dataset for model training.

8. The optical soft skin system for multimodal sensing of claim 1, wherein the processor is configured to execute a machine learning method for decoding different sensing modalities.

9. The optical soft skin system for multimodal sensing of claim 1, wherein the waveguide substrate has a heterogeneous composition.

10. The optical soft skin system for multimodal sensing of claim 9, wherein the waveguide substrate is comprised of multiple layers of materials so as to influence wave propagation.

11. The optical soft skin system for multimodal sensing of claim 9, wherein the heterogeneous composition has periodic variations in material properties to enhance sensitivity to different sensing modalities.

12. The optical soft skin system for multimodal sensing of claim 1, wherein the natural, un-deformed shape of the waveguide substrate is a flat rectangular prism.

13. The optical soft skin system for multimodal sensing of claim 1, wherein the waveguide substrate is of varying thickness in the direction of light propagation in the waveguide.

14. The optical soft skin system for multimodal sensing of claim 1, wherein wave propagation in the waveguide substrate is affected by changes in refraction, reflection, diffraction, and polarization induced by the waveguide substrate deformation patterns.

15. The optical soft skin system for multimodal sensing of claim 1, wherein the at least one light source emits light over different spectra, including at least one of invisible light and visible light.

16. The optical soft skin system for multimodal sensing of claim 1, wherein the at least one light receptor detects light intensity, wavelength, phase, or a combination thereof.

17. The optical soft skin system for multimodal sensing of claim 1, wherein each light receptor is sensitive to the entire spectrum of light transmitted by the at least one light source.

18. The optical soft skin system for multimodal sensing of claim 1, wherein the at least one light receptor is sensitive to the entire spectrum of transmitted light, or the at least one light receptor is sensitive to a specific range of the transmitted light.

19. The optical soft skin system for multimodal sensing of claim 1, wherein the at least one light source is a light-emitting diode and the at least one light receptor is a photodiode.

20. The optical soft skin system for multimodal sensing of claim 1, wherein there are at least three light sources which are light emitting diodes providing red, green and blue light outputs, respectively.

21. The optical soft skin system for multimodal sensing of claim 1, wherein the waveguide substrate has particles embedded therein that cause the transmitted light to be reflected, refracted, dispersed, absorbed or polarized when interacting with the particles.

22. The optical soft skin system for multimodal sensing of claim 1, wherein the waveguide substrate is fabricated with patterned channels or slots to enhance the effect of deformation on the transmitted light and the magnitude of association in mapping between mechanical changes and optical changes of the waveguide substrate.

23. The optical soft skin system for multimodal sensing of claim 1, further including a display and wherein a detected at least one of strain and displacement induced by bending, pressing, stretching, and twisting is visually reconstructed and presented in real time in three degrees of freedom on the display by the processor.

24. The optical soft skin system for multimodal sensing of claim 1, wherein design parameters including the waveguide substrate thickness, placement and number of light sources and light receptors, type of detected and transmitted light, and waveguide substrate shape can be customized to each surface prior to fabrication through numerical analysis.

25. The optical soft skin system for multimodal sensing of claim 24 wherein the numerical analysis is finite-element (FE) analysis.

26. The optical soft skin system for multimodal sensing of claim 1, wherein a simulated environment improves the quantity and quality of data for model training through finite element (FE) based data enrichment, where a simulated environment has the waveguide substrate modeled as a hyper-elastic material meshed in C3D8RH linear brick elements according to an elastic modulus, Poisson's ratio and parameters of MooneyRivlin hyper-elastic model.

27. The optical soft skin system for multimodal sensing of claim 1, wherein the soft skin is portable and further includes a wireless data transmitter for transmitting sensor signals.

28. The optical soft skin system for multimodal sensing of claim 1, wherein the soft skin is designed to be worn by a user as a wearable clothing device.

29. The optical soft skin system for multimodal sensing of claim 28 wherein the wearable clothing device is a glove on the hand of the user.

30. The optical soft skin system for multimodal sensing of claim 1, wherein the optical soft skin system is integrated into a robotic system for proprioception.

31. The optical soft skin system for multimodal sensing of claim 1, wherein the soft skin system further includes solid wire or liquid wire for electrical connection.

32. The optical soft skin system for multimodal sensing of claim 1, wherein the different sensing modalities further include an overall three dimensional surface morphology of the waveguide substrate.

\* \* \* \* \*